United States Patent [19]

Bride

[11] 3,869,488

[45] Mar. 4, 1975

[54] WERNER CHROMIUM COMPLEXES AND METHODS FOR THEIR PREPARATION

[75] Inventor: John Edwin Bride, Wilmington, Del.

[73] Assignee: E. I. du Pont de Nemours and Company, Wilmington, Del.

[22] Filed: Jan. 29, 1973

[21] Appl. No.: 327,662

Related U.S. Application Data

[63] Continuation-in-part of Ser. No. 117,045, Feb. 19, 1971, abandoned.

[52] U.S. Cl. ................. 260/438.5 C, 117/107.2
[51] Int. Cl. ............................................. C07f 11/00
[58] Field of Search ............... 260/438.5 R, 438.5 C

[56] References Cited
UNITED STATES PATENTS

| 2,524,803 | 10/1950 | Iler | 260/438.5 R X |
| 2,544,668 | 3/1951 | Goebel et al. | 260/438.5 R |
| 2,825,659 | 3/1958 | Dalton et al. | 260/438.5 C |
| 2,904,571 | 9/1959 | La Fleur | 260/438.5 R |
| 2,918,483 | 12/1959 | Varul | 260/438.5 R |
| 3,006,823 | 10/1961 | Deyrup | 204/51 |
| 3,107,198 | 10/1963 | Ambarski | 260/438.5 R X |
| 3,185,717 | 5/1965 | Trebilcock | 260/438.5 R |

OTHER PUBLICATIONS

Sidgwick, Chemical Elements & Their Cpds., Oxford Univ. Press., London, Vol. II, pg. 1004, (1950).

Primary Examiner—H. Sneed

[57] ABSTRACT

A Werner complex composition has trivalent chromium atoms coordinated with acido groups and chlorine atoms. The acido groups are from saturated aliphatic, hydroxy-containing, monocarboxylic acids having less than six carbon atoms and not more than three hydroxyl groups. A preferred composition is a chromium glycolato chloride complex. The complexes are characterized by a specific range for the ratio of both the chromium atoms to acido groups as well as chromium atoms to chlorine atoms. The complex composition is useful in preparing chromium plating baths that have a bright plating range that is unique in the history of decorative chromium plating.

20 Claims, No Drawings

WERNER CHROMIUM COMPLEXES AND METHODS FOR THEIR PREPARATION

CROSS REFERENCE TO RELATED APPLICATION

This application is a continuation-in-part of application Ser. No. 117,045, filed Feb. 19, 1971, assigned to the assignee of the present application, now abandoned.

BACKGROUND OF THE INVENTION

Formerly it has been shown to form complex compounds of the Werner type with trivalent nuclear chromium atoms and acyclic or carbocyclic carboxylic acido groups, using for the complexing action acids containing ten or more carbon atoms, i.e., typically long chain acids. The chromium atoms could also be further coordinated with neutral or monovalent groups, but this was of secondary importance. Representatives of such groups have been the aquo, chloro, fluoro, bromo, formato, acetato, and nitrato groups. The hydrophobic characteristics of surfaces treated with such compositions have been shown, for example, in U.S. Pat. Nos. 2,273,040 and 2,356,161.

It has been further shown in U.S. Pat. No. 2,524,803, that there can be produced in a special process, chlorine-containing complexes of the Werner type containing trivalent nuclear chromium atoms coordinated with carboxylic acido groups. In this process acids other than the above mentioned long chain acids may be used, including aliphatic, aromatic, saturated and unsaturated acids. The long chain acids are again selected for the hydrophobic characteristics of surfaces treated with the resulting complexes, whereas the shorter chain acids form complexes that are of particular interest for their bonding capabilities, especially to polymers, and thus such complexes find utility of the sizing of glass fiber rovings used as plastic and resin reinforcing material.

Of particular interest in the bonding of glass fibers to polymers, are the Werner complex compounds resulting from coordinating nuclear trivalent chromium with acido groups from alpha, beta-unsaturated monocarboxylic acids having from two to six carbon atoms. Additional coordinating positions can be satisfied by the above mentioned neutral or monovalent groups, as has been taught in U.S. Pat. No. 2,544,666. Additional disclosure with regard to the desirable bonding properties of Werner complexes, as between surfaces of diverse materials, particularly polymers, has been taught in U.S. Pat. No. 2,544,668.

In this latter mentioned patent, such acids that are not of the long chain type, and which most especially contain amine groups, but can be simple monocarboxylic acids or such acids containing not just one or a few, but very many hydroxyl groups, may be complexed with nuclear trivalent chromium to form compositions of the Werner type. Again, the metal may be further coordinated with the neutral or monovalent groups already discussed.

Turning to electrolytic operations, it has been shown that monohydroxy, monocarboxylic acids of short carbon chain are useful in electrolytic polishing baths. U.S. Pat. No. 2,645,611 discloses using lactic or glycolic acids as brighteners in an electrolytic polishing bath containing orthophosphoric acid and typically many other ingredients. It has further been taught in U.S. Pat. No. 3,006,823 that hydroxy-containing, monocarboxylic acids of a few carbon atoms may be complexed with trivalent chromium and the complex may be used to form an aqueous electrolytic plating bath for the plating of bright chromium plate. Such a bath can be of interest for the capability of depositing an acceptably bright plate at current densities within the range from 10–200 amperes per square foot (ASF).

SUMMARY OF THE INVENTION

The composition of the Werner complex described herein has trivalent chromium atoms coordinated with chlorine atoms and with acido groups of saturated aliphatic, hydroxy-containing, monocarboxylic acid having less than six carbon atoms and not more than three, and preferably only one, hydroxyl group. The complex finds particular utility in the preparation of an aqueous electrolytic plating bath for the deposition of bright chromium plate. The complex provides a decorative plate with a desirable bright finish, shows excellent plating speed in the low current density region, and the bright range can be from as high as about 1,000 ASF down to about 1 ASF, which is unique in the hisotry of decorative chromium plating. The complex of the present invention exhibits desirable water solubility, plus excellent plating utility over an extended pH range without dissociation or solids precipitation.

Broadly, the invention is directed to a composition of such a Werner complex having a ratio of total chromium atoms to total acido groups within the range of 1:0.7 to 1:2.9, and a ratio of total chromium atoms to total chlorine atoms within the range of 1:0.1 to 1:2.3.

The invention is further directed to the preparation of a composition of such a Werner complex by various procedures.

DESCRIPTION OF THE PREFERRED EMBODIMENTS

The complexes of this invention are completely miscible in all proportions in water and exhibit a rich deep greenish color in water solution. Solubility in organic solvents, for example aprotic organic solvents, will vary according to the particular solvent used but typically the complexes will exhibit greater than slight solubility in dimethylformamide and dimethylacetamide. Solutions exhibit extended storage stability and may be neutralized, or changed over to even an alkaline pH, without solids precipitation.

The complexes of this invention can be prepared by any of several methods. One method is the straightforward combination in aqueous medium of chromium metal, preferably in pulverulent form to enhance completion of the reaction, with the saturated aliphatic, hydroxy-containing monocarboxylic acid plus chlorine-providing compound. When particulate metal is used, the reaction can be highly exothermic and thus caution needs to be taken in carrying out such reaction. Typically for enhanced reaction efficiency, as the reaction proceeds and the evolved heat starts to diminish, external heating is applied and is continued with the aqueous medium being heated at reflux to augment completion of the reaction.

The complexes may also be prepared by the blending together of the carboxylic acid and chlorine-providing compound in an aqueous reaction medium to which there is charged chromic acid, suitably as a solution of chromic acid in water. The chromic acid can be supplied by any of the substances for forming chormic acid in water, e.g., chromium troxide. The reaction resulting from this method is also exothermic and caution in the use of such method is also thus advisable.

One preferred process involves establishing a liquid, aqueous reaction medium containing chromium hydroxy dichloride, $Cr(OH)Cl_2$, and the selected carboxylic acid. To this medium is added KOH which reacts with the $Cr(OH)Cl_2$ to provide a KCl value and leave chloride ion in the Werner complex reaction product. The addition of the KOH heats the reaction mixture to reaction temperatures without external heat. In each of the processes of the invention, proportions of the reactants are selected to produce Werner complexes with the desired compositions.

Another preferred process utilizes first the preparation of a liquid aqueous reaction medium containing HCl and the selected carboxylic acid. Potassium bichromate, $K_2Cr_2O_7$, is added to this reaction mixture to produce the desired complex.

A still more preferable process for preparing the complexes of the present invention also uses $K_2Cr_2O_7$ but dissolves it first in water and HCl before adding the carboxylic acid. It is desirable to keep the temperature of the $K_2Cr_2O_7$ — HCl solution below about 150°F. until the carboxylic acid is added, to optimize complex formation and minimize premature reaction of the $K_2Cr_2O_7$ and HCl.

The saturated aliphatic, hydroxy-containing monocarboxylic acids have less than six carbon atoms and not more than three hydroxyl groups and preferably, for economy, have two to four carbon atoms and one hydroxyl group. Thus, for economy, the acids of particular interest are the monohydroxy, monocarboxylic acids such as lactic acid, glycolic acid, and the monohydroxybutyric acids. The source of the chlorine atoms for the complex is advantageously provided, for efficiency and economy, simply by hydrogen chloride or by gaseous chlorine.

Regardless of the acid used and the source of chlorine, the complex composition should contain a molar ratio of total chromium atoms to total carboxyl constituent within the range of 1:0.7 to 1:2.9, and further contain a molar ratio of total chromium atoms to total chlorine atoms within the range of 1:0.1 to 1:2.3. Especially preferred ratios, which are based upon the utility of the complex in an aqueous plating bath for the deposition of decorative chromium plate, can depend upon the acid constituent of the complex. Thus, for example, in a complex where glycolic acid supplies a substantial amount of the carboxyl constituents, the molar ratio of all of the chromium atoms to all of the acido groups, i.e., to carboxyl constituent, is within the range of 1:1.9 to 1:2.6 and the molar ratio for such a complex of alll chromium atoms to the total of the chlorine atoms is preferably within the range of about 1:0.45 to 1:1.1.

The most preferred composition is a chromium glycolato chloride wherein the ratios of total chromium atoms to total acido groups to total chlorine atoms are about within the ranges of 1:2.2 to 2.6:0.8 to 0.4. An optimum composition has ratios of about 1:2.25:0.75.

For preparing a chromium plating bath for the deposition of bright chromium plate the complex is generally supplied to a plating medium in an amount providing about 25–150 grams of chromium per liter. The more highly concentrated baths are well suited for spot plating techniques while the baths containing the lesser concentrations of chromium are useful for immersing therein articles to be plated. Before deposition of chromium such baths are adjusted to a pH within the range from about 1.8 to 4.9 which can be readily handled by the addition of an alkali metal carbonate or hydroxide. The temperature of the bath during plating may range from about 20°C. up to not substantially above about 50°C. for enhancing plating performance.

The bath can also contain a salt of a strong acid preferably, for economy, an alkali metal salt. Such baths may further contain boric acid, or an equivalent to boric acid in aqueous solution, to augment the rate of deposition of the chromium. The alkali metal salts are usually present in an amount of about 50–200 grams per liter of the bath and the boric acid in an amount between about 10–70 grams per liter of the bath. During plating, the object to be plated is made the cathode, for example, immersed in the plating bath, or the cathode in a brush plating operation when the plating medium is contained in a brush, and an inert anode is used, such as a graphite anode. The surfaces that can be plated from such a bath, include metals such as steel, brass, copper, nickel and the like as well as plastic surfaces that are activated or prepared for an electroplating operation. The plating can be carried out in any vessel useful for chromium electroplating such as tanks lined with corrosion resistant materials including glass, ceramic material, polyvinyl chloride and the like.

The invention will be further understood by reference to the following illustrative examples which should not be construed as limiting the invention.

EXAMPLE I

Into a container there is placed 0.8 mole of chromium metal, 1.8 mole of glycolic acid of 70 percent strength, that is, 70 percent of glycolic acid and the balance water, and 0.5 mole of 37.3 percent strength hydrochloric acid which is 37.3 percent by weight HCl in water. The container is covered and good ventilation is provided. After the ingredients are placed together in the container, dissolution of the chromium starts slowly but gradually increases thus supplying heat to the reaction. As the reaction continues, the temperature of the reaction medium reaches 70°C. without external heating, and the chromium metal can be seen by visual inspection to be substantially dissolved. As the temperature starts to subside from 71°C., external heating is applied and the temperature of the reaction medium is permitted to reach 88°C. and held there until all the chromium is dissolved. Total reaction time, i.e., to complete chromium metal dissolution, is about 4 hours. Thereupon the solution is heated at reflux, reaching a temperature of 107°C., for about 2 hours, and is thereafter permitted to cool.

To resulting chrome complex solution thus prepared there is added sufficient water to form a solution of the complex providing such solution with 40 grams per liter (g./l.) of chromium. The resulting solution is a clear, deep greenish solution that exhibits excellent extended storage stability without solids precipitation or color change. The solution contains a molar ratio of total chromium to total glycolic acid of 1:2.25 and a molar ratio of all chromium atoms to the total of the chlorine atoms of 1:0.625. The portion of the chrome complex solution is blended with potassium hydroxide in sufficient amount to change the pH of the portion from acid, past neutral, over to an alkaline pH greater than 8. Upon visual inspection, such alkaline chrome complex solution is seen to be free from color change or visible solids precipitation.

To demonstrate the plating characteristics of such chromium complex solution, sufficient complex solution is prepared as described above to contain 40 g./l. of chromium, and to this is blended 56.6 g./l. of $H_3BO_3$ and 150 g./l. of potassium chloride, with agitation. The pH of the solution is adjusted to 3.4 and during blending and pH adjustment the volume of the solution is adjusted to 1 liter by the addition of deionized water.

For this demonstration the resulting solution is placed in a modified Hull cell which is a trapezoidal box of non-conductive material at the opposite ends of which are positioned anode and cathode plates, as has been more particularly described in an article appearing in "Plating" Volume 46, Number 3, (1959), Page 257. With this cell it is possible to readily determine the effective plating range of a composition under varying conditions. The current density at any point on a cathode is determined according to the formula $A = C(27.7 - 48.7 \log L)$ wherein A is the current density in amps per square foot (ASF) at the selected point, C is the total current in amps applied to the cell, and L is the distance in inches of the selected point from the high current density end of the plate. In the cell graphite anodes are used and the cathode is a 3 15/16 × 2 5/8 inches brass panel that is nickel coated prior to use in the cell.

In this cell palting tests are carried out at a bath temperature of 87°F. and at 12.5 volts using 10 amperes current for a 3-minute cycle. From such tests the bright range of decorative chromium plating is seen to be from about 800 ASF down to 6 ASF. The panel has a relative reflectance value of 50 percent and the deposit has a desirably rich and deep appearance of a slightly draker cast than that observed with commercially available decorative chromium deposits from hexavalent chromium plating baths.

EXAMPLE II

In the manner of Example I there is placed sufficient pulverulent chromium metal, with sufficient 88.4 percent strength lactic acid, that is, 88.4 weight percent lactic acid and the balance water, and with sufficient 37.3 percent strength hydrochloric acid, to provide a solution containing 40 g./l. of chromium and having a mole ratio of total chromium to total lactic acid of 1:1.625 and a molar ratio of chromium atoms to the total of the chlorine atoms of 1:0.625. The contents of the container are reacted in the manner of Example I, i.e., are permitted to react without external heating, followed by external heating and subsequently by refluxing.

This resulting chrome complex solution thus prepared is a clear, deep greenish solution that exhibits excellent extended storage stability without solids precipitation of color change. This chrome complex solution can be blended with potassium hydroxide in sufficient amount to change the pH of the portion from acid, past neutral, over to an alkaline pH greater than 8. Upon visual inspection, such alkaline chrome complex solution can be seen to be free from color change or visible solids precipitation.

To demonstrate the plating characteristics of such chromium complex solution, sufficient complex solution is prepared as described above to contain 40 g./l. of chromium and to this is blended about 60 g./l. of $H_3BO_3$ and about 150 g./l. of potassium chloride, with agitation. The pH of the solution is adjusted to 3.0 and during blending and pH adjustment the volume of the solution is adjusted to 1 liter by the addition of deionized water.

A plating test is conducted in the manner of Example I, and is carried out at a bath temperature of 90°F. and at 14 volts using 10 amperes current for a 3-minute cycle. From such tests the bright range of decorative chromium plating is seen to be from about 1,000 ASF down to 1 ASF, which is unique in the history of decorative chromium plating. The panel has the desirably rich and deep appearance exhibited by the panel described in Example I.

EXAMPLE III

To 172 milliliters (ml.) of water solution of chromium hydroxy dichloride, $Cr(OH)Cl_2$, containing 19.1 percent by weight chromium, is added 218 ml. of a 70 percent solution in water of hydroxyacetic acid, otherwise known as glycolic acid, $HOOC \cdot CH_2HO$. Then 91.2 grams of dry KOH are added. The addition of the KOH heats the reaction mixture to about 140–150°F. without the application of external heat. The reaction mixture is allowed to cool to 80°C. before using it as taught in Example I to formulate a plating bath with about an hour of standing at temperature over about 130°F.

During the time at elevated temperature, the KOH reacts with the $Cr(OH)Cl_2$ to produce KCl values in solution, leaving a certain amount of chlorine in the Werner complex reaction product. The product has ratios of total chromium atoms to total acido groups to total chlorine atoms of about 1:2.53:0.38. Desirable plating results are achieved with this product.

EXAMPLE IV

In an open-top, glass-lined, jacketed, reaction vessel, 669 ml. of a 70 percent solution in water of $HOOC \cdot CH_2OH$ and 233 ml. of 34.1 percent HCl are stirred together. Potassium bichromate is added in about 2.5 g. increment at 15-second intervals for 6 minutes at which time the temperature should be about 180°F. The reaction mixture is then allowed to rise to a maximum of 200°F. over the next 4 minutes.

Cooling water is then run through the jacket of the reaction vessel while more $K_2Cr_2O_7$ is added in about 2.5 g. increments at 20-second intervals until a total of 358 g. of $K_2Cr_2O_7$ has been added. The addition should be fast enough to keep the temperature above 180°F. and slow enough to avoid overflowing as the reaction mixture foams up with each addition. After all the $K_2Cr_2O_7$ has been added, the cooling is continued until the temperature is below about 100°F.

The reaction product will have ratios of total chromium atoms to total glycolic acid groups to total chlorine atoms of about 1:1.9:1.0. It can can be used in a plating bath in the same manner as described in Example VI, obtaining similar results.

EXAMPLE V

Fifty ml. cold water and 100 ml. laboratory grade concentrated HCl are added to a 500 ml. beaker and heated to 140°F. To this, 170 g. $K_2Cr_2O_7$ is added with stirring and slow heating to 160°F. until the $K_2Cr_2O_7$ is completely dissolved. The temperature is not taken over 170°F. at this stage to avoid starting a reaction between KCl and $K_2Cr_2O_7$.

To the solution 280 ml. of 70 percent HOOC·CH$_2$OH is added, dropwise at first, with stirring. An exothermic reaction takes place reducing Cr(VI) to Cr(III). The rate of addition should be adjusted to maintain the temperature in the 190°to 214°F. range. External heat can be added if necessary. The solution is finally held at 210° to 214°F. for 15 to 30 minutes and then allowed to cool to under 80°F. before it is used to produce a plating bath. Small amounts of water can be added during the reaction if needed to permit continued stirring as the viscosity increases.

This reaction will produce a product with about 150 g./l. chromium values and with ratios of total chromium atoms to total glycolic acid groups to total chlorine atoms of about 1:2.83:1.07.

EXAMPLE VI

The procedure of Example V was repeated using 377 g. K$_2$Cr$_2$O$_7$, 622 ml. HOOC·CH$_2$OH (70%), 222 ml. HCl and 111 ml. H$_2$O. This gave a product with such ratios of 1:2.8:1.06.

This reaction product can be made into a plating bath of about 1,500 ml. by the following procedure: To a 2 liter beaker add 400 ml. of the reaction product and dilute to about 1,100 ml. with tap water. Stir and heat to 125°–130°F. Add 262 g KCl, stir into the bath and hold temperature in the 120–130°F. range. Add 84 g H$_3$BO$_3$, stir in thoroughly and discontinue heating. Add 10 ml. methyl dioxitol, stir it thoroughly and let bath cool to 75°–80°F. Adjust the volume to 1,450 ml. volume with tap water. Adjust the pH to 3.15 with NaOH (50%) until stabilized at pH 3.15. Adjust to final 1,500 ml. volume by adding more water if necessary. The resulting plating bath gives quite satisfactory decorative chromium plating results.

Modified Hull Cell plating tests were conducted to show the plating ability of such a bath having a concentration of 40 g./l. of chromium values. The tests used a current of 10 amperes for 3 minutes at 80°F., 13.0 volts, and a pH of 3.15. The coverage was 97 percent with a plating speed of 30 × 10$^{-6}$ inches at 400 amps/sq.ft./3 min. and of 12 × 10$^{-6}$ inches at 40 amps/sq. ft./3 min. The bright chromium plating range was from 950 ASF down to 4 ASF.

EXAMPLE VII–IX

Electroplating tests were made with preferred compositions of the invention made in accordance with Example I but with ratios of total chromium atoms to total glycolic acid groups to total chlorine atoms of 1:2.5:0.5, 1:2.25:0.75, and 1:2.5:1. These tests at various cathode current densities gave approximately the thickness of chromium plate shown in Table I below. The plating speed at low current densities is commercially quite desirable. These results typify results obtained with compositions of the invention made by the various processes of the invention.

TABLE I

| | Chromium Thickness | | |
|---|---|---|---|
| Cathode Current Density (amp/sq.ft.) | Ratios of Cr:glycolate:Cl | | |
| | 1:2.5:0.5 | 1:2.25:0.75 | 1:2.5:1 |
| 10 | | 1.3 | |
| 20 | 1.3 | 3.0 | 2.6 |
| 40 | 5.5 | 5.8 | 5.0 |
| 100 | 12.5 | 11.0 | 7.8 |

What is claimed is:

1. A composition of a Werner complex of trivalent chromium atoms coordinated with acido groups of saturated aliphatic, hydroxy-containing, monocarboxylic acid having less than six carbon atoms and not more than three hydroxyl groups, and providing said complex composition with a ratio of total chromium atoms to total acido groups about within the range of 1:0.7 to 1:2.9, said complex composition being further characterized by containing coordinated chlorine atoms and having a ratio of total chromium atoms to total chlorine atoms about within the range of 1:0.1 to 1:2.3.

2. A composition of claim 1 wherein said aliphatic, hydroxy-containing monocarboxylic acid of said Werner complex is lactic acid.

3. A composition of claim 1 wherein said aliphatic, hydroxy-containing monocarboxylic acid of said Werner complex is glycolic acid.

4. A composition of claim 3 wherein the ratio of total chromium atoms to total acido groups is about within the range of 1:1.9 to 1:2.6 and the ratio of total chromium atoms to total chlorine atoms is about within the range of 1:0.45 to 1:1.1.

5. A composition of claim 3 wherein the ratios of total chromium atoms to total acido groups to total chlorine atoms are about within the ranges of 1:2.2 to 2.6:0.8 to 0.4.

6. A composition of claim 5 wherein the ratios of total chromium atoms to total acido groups to total chlorine atoms are about 1:2.25:0.75.

7. A process for the production of a composition of a Werner complex having trivalent chromium atoms coordinated with chlorine atoms and with acido groups of saturated aliphatic, hydroxy-containing, monocarboxylic acid having less than six carbon atoms and not more than three hydroxyl groups, which method comprises:

1. establishing a liquid, aqueous reaction medium containing chromium metal and sufficient of said carboxylic acid to provide said medium with a molar ratio of total chromium atoms to total acido groups within the range of 1:0.7 to 1:2.9, and with sufficient chlorine-providing compound to supply said reaction medium with a molar ratio of total chromium atoms to total chlorine atoms within the range of 1:0.1 to 1:2.3; and 2. permitting reaction of the constituents in said medium.

8. The process of claim 7 wherein said chlorine compound is selected from the group consisting of hydrogen chloride, chlorine gas, and mixtures thereof.

9. The process of claim 7 wherein said saturated aliphatic, hydroxy-containing, monocarboxylic acid is selected from the group consisting of glycolic acid, lactic acid, and mixtures thereof.

10. The process of claim 7 wherein water supplies all of the liquid of said reaction medium, such medium is heated to boiling during reaction, and said chromium metal is in pulverulent form.

11. A process for preparing a composition of a Werner complex containing trivalent chromium atoms coordinated with chlorine atoms and with acido groups saturated saturateed aliphatic, hydroxy-containing, monocarboxylic acid having less than six carbon atoms and not more than three hydroxyl groups, which process comprises:

1. bringing together in a liquid, aqueous reaction medium, chromic acid with sufficient of said carboxylic acid to provide said medium with a molar ratio of total chromium atoms to total acido groups within the range of 1:0.7 to 1:2.9, and with chlorine-providing compound sufficient to supply said medium with a molar ratio of total chromium atoms to total chlorine atoms within the range of 1:0.1 to 1:2.3; and
2. permitting reaction of the constituents in said medium.

12. The process of claim 11 wherein said chlorine-providing compound is selected from the group consisting of hydrogen chloride, chlorine gas, and mixtures thereof.

13. The process of claim 11 wherein said saturated aliphatic, hydroxy-containing, monocarboxylic acid is selected from the group consisting of glycolic acid, lactic acid, and mixtures thereof.

14. A process for preparing a composition of a Werner complex containing trivalent chromium atoms co-ordinated with chlorine atoms and with acido groups of saturated aliphatic, hydroxy-containing, monocarboxylic acid having less than six carbon atoms and not more than three hydroxyl groups, which process comprises:
   1. extablishing a liquid, aqueous reaction medium containing chromium hydroxy dichloride and sufficient of said carboxylic acid to provide said medium with a molar ratio of total chromium atoms to total acido groups about within the range of 1:0.7 to 2.9;
   2. adding to said medium sufficient potassium hydroxide to react with the chromium hydroxy dichloride to provide a potassium chloride value and leave chloride ion in the Werner complex reaction product with a molar ratio of total chromium atoms to total chlorine atoms about within the range of 1:0.1 to 2.3; and
   3. permitting reaction of the constituents in said medium.

15. The process of claim 14 wherein said saturated aliphatic, hydroxy-containing, monocarboxylic acid is glycolic acid.

16. A process for preparing a composition of a Werner complex containing trivalent chromium atoms co-ordinated with chlorine atoms and with acido groups of saturated aliphatic, hydroxy-containing, monocarboxylic acid having less than six carbon atoms and not more than three hydroxyl groups, which process comprises:
   1. establishing a liquid, aqueous reaction medium containing hydrochloric acid and enough of said carboxylic acid to provide said medium with a molar ratio of total chloride atoms to total acido groups about within the range of 0.1 to 2.3:0.7 to 2.9;
   2. adding to said medium sufficient potassium bichromate to react with said hydrochloric acid and said carboxylic acid to produce said Werner complex with a molar ratio of total chromium atoms to total acido groups about within the range of 1:0.7 to 2.9 ana a molar ratio of total chromium atoms to total chlorine atoms about within the range of 1:0.1 to 2.3; and
   3. permitting reaction of the constituents in said medium.

17. The process of claim 16 wherein said saturated aliphatic, hydroxy-containing, monocarboxylic acid is glycolic acid.

18. A process for preparing a composition of a Werner complex containing trivalent chromium atoms co-ordinated with chlorine atoms and with acido groups of saturated aliphatic, hydroxy-containing, monocarboxylic acid having less than six carbon atoms and not more than three hydroxyl groups, which process comprises:
   1. establishing a liquid, aqueous reaction medium containing hydrochloric acid and sufficient potassium bichromate to provide said medium with a molar ratio of total chromium atoms to total chlorine atoms about within the range of 1:0.1 to 2.3;
   2. adding to said medium enough of said carboxylic acid to react with said hydrochloric acid and said potassium bichromate to produce said Werner complex with a molar ratio of total chromium atoms to total acido groups about within the range of 1:0.7 to 2.9; and
   3. permitting reaction of the constituents in said medium.

19. The process of claim 18 wherein the reaction mixutre of step (1) is held at temperatures below about 150°F. until said carboxylic acid is added in step (2).

20. The process of claim 18 wherein said saturated aliphatic, hydroxyl-containing monocarboxylic acid is glycolic acid.

* * * * *

UNITED STATES PATENT OFFICE
CERTIFICATE OF CORRECTION

PATENT NO. : 3,869,488
DATED : MARCH 4, 1975
INVENTOR(S) : JOHN EDWIN BRIDE

It is certified that error appears in the above-identified patent and that said Letters Patent are hereby corrected as shown below:

Column 8, line 63, after "groups" add -- of --.

Column 8, line 64, delete "saturateed".

Column 9, line 27, "extablishing" should be -- establishing --.

Column 10, line 14, "ana" should be -- and --.

Column 10, line 43, "mixutre" should be -- mixture --.

Signed and sealed this 1st day of July 1975.

(SEAL)
Attest:

RUTH C. MASON
Attesting Officer

C. MARSHALL DANN
Commissioner of Patents
and Trademarks